United States Patent
Bell

(10) Patent No.: US 7,436,814 B2
(45) Date of Patent: Oct. 14, 2008

(54) SELECTING TRANSPORT ADDRESSES TO ROUTE STREAMS BETWEEN ENDPOINTS

(75) Inventor: Robert T. Bell, Bountiful, UT (US)

(73) Assignee: Cisco Technology, Inc., San Jose, CA (US)

( * ) Notice: Subject to any disclaimer, the term of this patent is extended or adjusted under 35 U.S.C. 154(b) by 692 days.

(21) Appl. No.: 11/112,086

(22) Filed: Apr. 22, 2005

(65) Prior Publication Data

US 2006/0239261 A1    Oct. 26, 2006

(51) Int. Cl.
*H04L 12/28* (2006.01)

(52) U.S. Cl. .................. 370/351; 709/223; 709/227; 455/557

(58) Field of Classification Search .................. 709/223, 709/225, 230, 220; 370/338, 475, 230, 313, 370/328
See application file for complete search history.

(56) References Cited

U.S. PATENT DOCUMENTS

| | | | |
|---|---|---|---|
| 6,591,306 B1* | 7/2003 | Redlich | 709/245 |
| 6,999,791 B1* | 2/2006 | Ishikura et al. | 455/557 |
| 7,197,560 B2* | 3/2007 | Caslin et al. | 709/224 |
| 2003/0009561 A1* | 1/2003 | Sollee | 709/227 |
| 2003/0028671 A1* | 2/2003 | Mehta et al. | 709/245 |
| 2005/0076108 A1* | 4/2005 | Li et al. | 709/223 |

OTHER PUBLICATIONS

Rekhter, Y., et al., "*Address Allocation for Private Internets*", Network Working Group, Request for Comments 1918, 9 pages, Feb. 1996.
Rosenberg, J., "*Interactive Connectivity Establishment (ICE): A Methodology for Network Address Translator (NAT) Traversal for Multimedia Session Establishment Protocols*", Draft-ietf-mmusic-ice-03, © The Internet Society (2004), pp. 1-45, Oct. 25, 2004.

* cited by examiner

*Primary Examiner*—Huy D. Vu
*Assistant Examiner*—David Oveissi
(74) *Attorney, Agent, or Firm*—Baker Botts L.L.P.

(57) ABSTRACT

Selecting a transport address for a call session between a first endpoint of a first region and a second endpoint of a second region includes determining that the call session is being initiated. A relationship between the first region and the second region is determined. One or more transport addresses of the first endpoint are identified in accordance with the relationship to yield one or more selected transport addresses.

20 Claims, 3 Drawing Sheets

US 7,436,814 B2

SELECTING TRANSPORT ADDRESSES TO ROUTE STREAMS BETWEEN ENDPOINTS

TECHNICAL FIELD

This invention relates generally to the field of telecommunications and more specifically to selecting transport addresses to route streams between endpoints.

BACKGROUND

A network comprises components supporting communication between endpoints. Routing streams among endpoints of a local area network and endpoints of another network may involve processes such as network address translation. These processes, however, use network resources. Accordingly, routing streams may not be sufficiently efficient in certain situations.

SUMMARY OF THE DISCLOSURE

In accordance with the present invention, disadvantages and problems associated with previous techniques for routing streams may be reduced or eliminated.

According to one embodiment of the present invention, selecting a transport address for a call session between a first endpoint of a first region and a second endpoint of a second region includes determining that the call session is being initiated. A relationship between the first region and the second region is determined. One or more transport addresses of the first endpoint are identified in accordance with the relationship to yield one or more selected transport addresses.

Certain embodiments of the invention may provide one or more technical advantages. A technical advantage of one embodiment may be that an optimizer may select transport addresses that have a higher probability of enabling communication between endpoints over addresses that have a lower probability. The endpoints may attempt to communicate using the selected addresses, but not the other addresses. Attempting communication with addresses that have a higher probability of enabling communication may provide for more efficient communication between endpoints.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
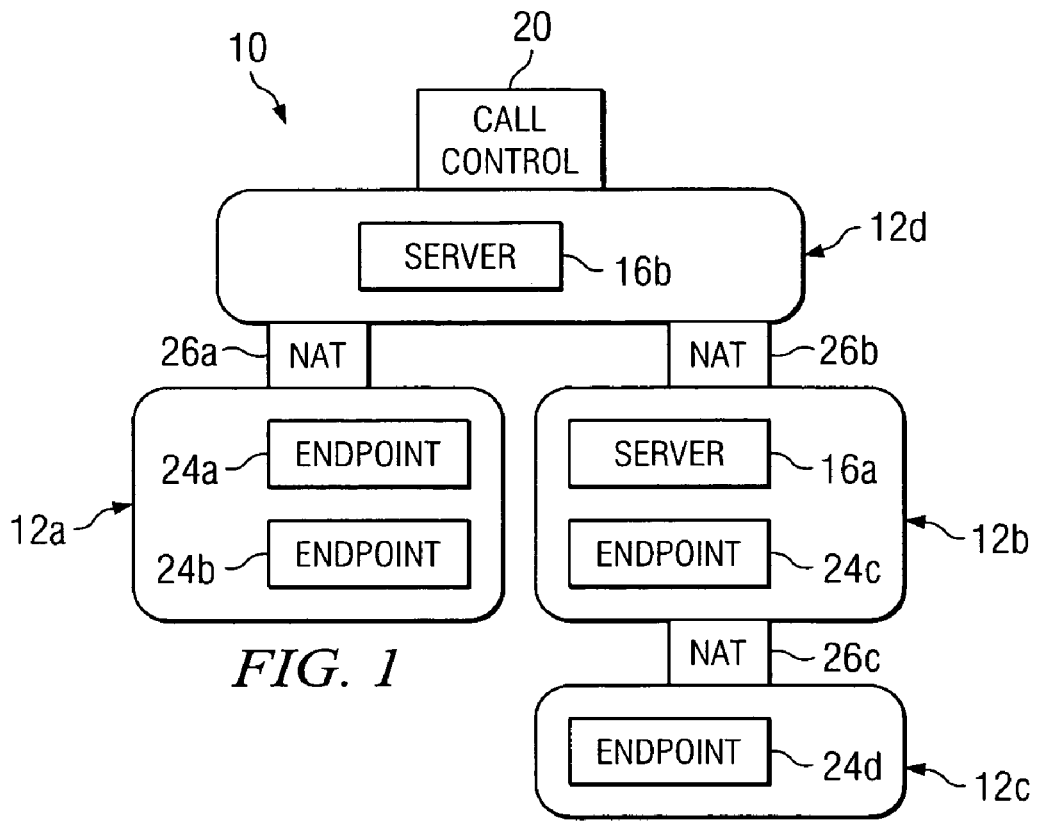
FIG. 1 is a block diagram of one embodiment of a network system that may be used to select transport addresses.

FIG. 1 is a block diagram of one embodiment of a network system 10 that may be used to select transport addresses. According to the embodiment, network system 10 includes network regions 12 and a call control 20 coupled by network address translators (NATs) 26 as shown. Network regions 12 may include endpoints 14 and address servers 16.

According to an example embodiment of operation, a caller endpoint 24a sends a packet to a callee endpoint 24c. The packet has the internal source address of caller endpoint 24a. Network address translator 26 translates the internal source address to an external source address, which may be used as a transport address to allow for communication between caller endpoint 24a and callee endpoint 24c. Network address translator typically, however, does not provide the external source address to caller endpoint 24a.

According to the embodiment, caller endpoint 24a may request transport addresses from address servers 16. Call control 20 may include an optimizer that selects transport addresses that have a higher probability of enabling communication between endpoints 24. Call control 20 sends the selected addresses to callee endpoint 24c to allow endpoints 24a and 24c to communicate. Attempting communication with addresses that have a higher probability of enabling communication may provide for more efficient communication between endpoints 24.

According to the illustrated embodiment, system 10 includes network regions 12. A network may represent any suitable combination or arrangement of components supporting communication between endpoints 24. A network may comprise a local area network (LAN), a wide area network (WAN), a public switched telephone network (PSTN), the Internet, other suitable communications network, or any combination of the preceding.

According to one embodiment, a network region 12 may be associated with a network address translator 26 that provides internal addresses for the network region 12. Internal addresses may be used to communicate among devices of the same network region 12, and external addresses may used to communicate among devices of distinct network regions 12. An internal address may refer to an address that is not provided to networks outside of network region 12. For example, an internal address may comprise an Internet Engineering Task Force (IETF) Request for Comments (RFC) 1918 private address, a private Internet Protocol (IP) address, or both. An external address may refer to an address that is provided to networks outside of network region 12. For example, an external address may comprise a public IP address.

According to the illustrated embodiment, network regions 124a-c associated with a network address translator 26 may represent local networks. A first local network may be different from a second local network, which may mean that the components of the first local network are managed separately from the components of the second local network. A local network may be managed by, for example, a call manager.

Network regions 124a-c include endpoints 24. An endpoint may refer to any suitable combination or arrangement of logic for providing communication services such as telephony services. Logic may refer to hardware, software, or any suitable combination of hardware and software. Examples of a communication device may include a telephone, a cell phone, a personal digital assistant, a voice appliance, an answering machine, a facsimile machine, a computer, a server, or other device operable to communicate with a communication network.

Endpoints 24 may be engaged in a call session. A call session may refer to an arrangement between endpoints 24 that allows for the exchange of information between endpoints 24. A call session involves the transfer of packets between endpoints 24. A packet may comprise a bundle of data organized in a specific way for transmission, and a frame may comprise the payload of one or more packets organized in a specific way for transmission. A packet may carry any suitable information such as voice, data, video, audio, multimedia, other information, or any combination of the preceding. A stream may refer to packets communicated from one device to another, and may have media, control, or other type of packets.

A caller endpoint 24 may initiate a call session to place a call to a callee endpoint 24. An internal call refers to a call between endpoints 24 that belong to the same region 12. For example, a call between endpoint 24a and endpoint 24b of network region 12a may be referred to as an internal call. An internal call may typically be processed without translating between internal and external addresses.

An external call refers to a call between endpoints 24 of different network regions 12. For example, a call between endpoint 24b of network region 12a and endpoint 24c of network region 12b may be referred to as an external call. An external call may typically cross a communication interface. A communication interface may refer to an interface that converts between communication protocols. The conversion may occur between any suitable protocols, such as any two of Internet Protocol, H.323 protocol, or Session Initiation Protocol (SIP). As an example, endpoint 24a may comprise an IP telephone. A call from endpoint 24a to endpoint 24c may cross an interface that converts between Internet Protocol and H.323 protocol or Session Initiation Protocol.

Network address translator 26 translates between external and internal addresses in order to communicate streams between internal and external endpoints 24. The header of a packet leaving a network region 12 includes an internal source address. Network address translator 26 translates the internal source address into an external address. The header of a packet entering network region 12 includes an external destination address. Network address translator 26 translates the external destination address into an internal address. Network address translator 26 typically manipulates only the header of the packet to translate an address.

According to one embodiment, a network address translator 26 may define a region. A region defined by a network address translator 26 may refer to the entities for which translator 26 translates their internal addresses to external address. For example, endpoints 24a-b are members of region 12a defined by network address translator 26a, endpoint 24c is a member of region 12b defined by network address translator 26b, and endpoint 24d is a member of region 12c defined by network address translator 26c.

The members of regions may be used to establish relationships between the regions. For example, the same regions may have substantially all members in common, and distinct regions may have substantially no members in common. Different regions may have at least one or more members not in common. A first region may be a subset of a second region if the second region includes the members of the first region.

An address server 16 represents any suitable combination or arrangement of logic for determining transport addresses for endpoints 22. A transport address may refer to a point at which a stream may be received. A transport address may comprise, for example, an IP address and a port at which media streams may be received. Transport addresses may include external addresses, internal addresses, or other suitable addresses. A transport address may be associated with a region if the address may be used by one member of the region to send a packet to another member of the region.

According to an example embodiment of operation, server 16 may receive a packet from endpoint 24a sent through network address translator 26a. The header of the packet includes the external address of endpoint 24a. Server places the external address in the body of the packet, so network address translator 26 does not remove the external address.

A server 16 may provide transport addresses using any suitable protocol such as Simple Traversal of User datagram protocol (UDP) through Network address translation (NAT) (STUN), Traversal Using Relay NAT (TURN), or Realm Specific IP (RSIP). Servers 16 may operate according to different protocols, and may provide different transport addresses for the same endpoint 24.

Call control 20 represents any suitable combination or arrangement of logic for providing network services such as selecting transport addresses. Call control 20 may include an optimizer that selects a subset of transport addresses. Call control 20 is described in more detail with reference to FIG. 2.

Modifications, additions, or omissions may be made to system 10 without departing from the scope of the invention. The components of system 10 may be integrated or separated according to particular needs. For example, the optimizer may be located in a network device other than call control 20. Moreover, the operations of system 10 may be performed by more, fewer, or other modules. Additionally, operations of system 10 may be performed using any suitable logic comprising software, hardware, other logic, or any suitable combination of the preceding. As used in this document, "each" refers to each member of a set or each member of a subset of a set.

Figure 2:
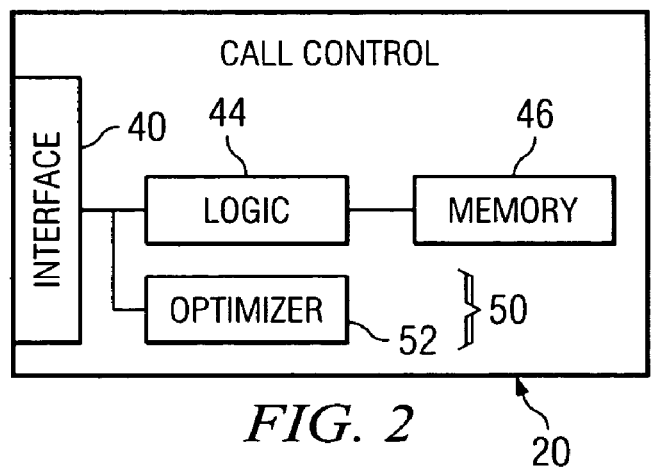
FIG. 2 is a block diagram of a call control that includes one embodiment of an optimizer that may be used to select transport addresses.

FIG. 2 is a block diagram of a call control 20 that includes one embodiment of an optimizer that may be used to select transport addresses. According to the illustrated embodiment, call control 20 includes one or more interfaces (IFs) 40, logic 44, memory 46, and one or more modules 50 coupled as shown. An interface 40 receives and sends packets. An interface may refer to any suitable structure of a device operable to receive input for the device, send output from the device, or both, and may comprise one or more ports.

Logic 44 manages the operation of call control 20, and may comprise any suitable hardware, software, or combination of hardware and software. For example, logic 44 may include a processor. A processor may refer to any suitable device operable to execute instructions and manipulate data to perform operations.

Memory 46 stores and facilitates retrieval of information used by logic 44. As an example, memory 46 may store information about the regions of system 10. The information may describe the members of the regions, transport addresses associated with the regions, and other suitable information. Examples of memory 46 may include Random Access Memory (RAM), Read Only Memory (ROM), magnetic drives, disk drives, Compact Disk (CD) Drives, Digital Video Disk (DVD) drives, removable media storage, other suitable data storage device, or any combination of the preceding.

According to the illustrated embodiment, modules 50 include an optimizer 52. Optimizer 52 identifies transport addresses to use for a call session. The addresses may be selected according to any suitable selection rule. A selection rule may refer to a rule used to select one or more addresses that have a higher probability of enabling efficient communication of streams between endpoints 24. As an example, if the caller endpoint 24a and the callee endpoint 24b belong to the same region, then one or more internal addresses of the region may be selected. As another example, if the endpoints 24 belong to different regions that intersect, then one or more transport addresses that are associated with the intersection of the regions may be selected. As yet another example, if the endpoints 24 belong to distinct regions that do not intersect, then one or more transport addresses that are associated with a superset region that includes the distinct regions may be selected. The smallest superset region that includes the distinct regions may be used.

The selected transport addresses may be prioritized such that endpoint 24 tries a higher priority transport address before trying a lower priority transport address. Endpoint 24 may also switch to a higher priority transport address if it is currently using a lower priority transport address. The addresses may be prioritized according to any suitable prioritization rule. A prioritization rule may refer to a rule that gives a higher priority to a transport address that has a higher probability of enabling efficient communication of streams between endpoints 24. As an example, if endpoints 24 belong to more than one common region, a transport address associated with a smaller common region may be given a higher priority than a transport address corresponding to a larger common region.

As another example, a transport address that involves the use of a relay may be given a lower priority than a transport address that does not involve the use of a relay. As another example, a transport address associated with a more recent protocol may be given a higher priority than a transport address associated with an older protocol. As another example, a transport address associated with a secure network may be given a higher priority than a transport address that is not associated with a secure network.

A prioritization rule may be selected based on the caller and the callee endpoints 24. For example, one prioritization rule may be used if the caller and callee endpoints 24 belong to the same network region 12, and another prioritization rule may be used if the caller and callee endpoints 24 belong to different network regions 12.

The selected transport addresses may be encoded as a series of candidate elements. A candidate element may be used to convey the transport address and other information, for example, information for any suitable routing protocol such as real-time transport protocol (RTP) or real-time conferencing protocol (RTCP). For example, a candidate element may include a transport address for RTP, a transport address for RTCP, a STUN username fragment and password for RTP, and a STUN username fragment and password for RTCP. A candidate element may have a unique candidate identifier. The selected transport addresses may include a default address. A default address may refer to an address that may be used by callee endpoints as a default.

Modifications, additions, or omissions may be made to call control 20 without departing from the scope of the invention. The components of call control 20 may be integrated or separated according to particular needs. Moreover, the operations of call control 20 may be performed by more, fewer, or other modules. Additionally, operations of call control 20 may be performed using any suitable logic comprising software, hardware, other logic, or any suitable combination of the preceding.

Figure 3:
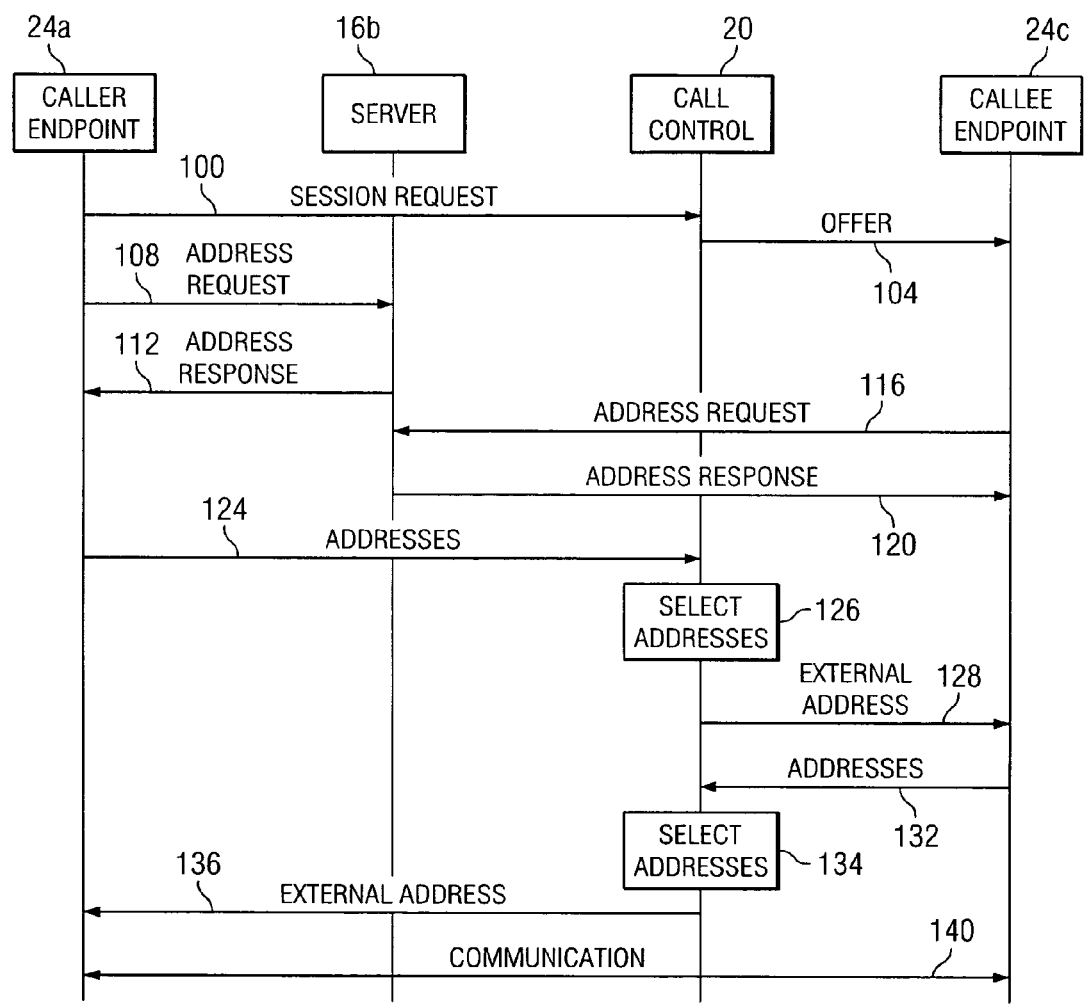
FIG. 3 is a call flow diagram of one embodiment of a method for selecting transport addresses.

FIG. 3 is a call flow diagram of one embodiment of a method for selecting transport addresses for a call session between endpoints 24 of different regions 12. According to the embodiment, caller endpoint 24a of region 12a initiates a call session with callee endpoint 24c of region 12b.

The method begins at step 100, where caller endpoint 24a sends a request for a call session with callee endpoint 24c to call control 20. Call control 20 sends an offer for the call session to callee endpoint 24c at step 104. Caller endpoint 24a sends an address request to server 16b to gather caller transport addresses at step 108. Addresses may be requested at any suitable time. For example, the addresses may be requested in response to a gather trigger. Examples of a gather trigger include a user interface cue such as picking up a handset or inputting an entry into an address book. Server 16b determines the transport addresses, which may include an external address and an internal address for caller endpoint 24a. Server 16b sends the addresses to caller endpoint 24a in an address response at step 112.

Callee endpoint 24c sends an address request to server 16b to gather callee transport addresses at step 116. Server 16b determines the transport addresses, which may include an external address and an internal address for callee endpoint 24c. Server 16b sends the addresses to callee endpoint 24c in an address response at step 120.

Caller endpoint 24a sends the caller transport addresses to server 16b at step 124. Call control 20 selects caller transport addresses according to a selection rule at step 126. For example, call control 20 may select addresses that have a higher probability of enabling efficient communication between endpoints 12. According to the illustrated embodiment, since caller and callee endpoints 24 are of different regions 12, call control 20 selects the external address of caller endpoint 24a. If, however, caller and callee endpoints 24 are of the same region 12, call control 20 may select the internal address of caller endpoint 24a.

Call control 20 may also prioritize the selected transport addresses according to a prioritization rule. For example, call control 20 may give a higher priority to transport addresses that have a higher probability of enabling communication between endpoints 24. Call control 20 may insert a transport addresses into a message that associates the address with a user name, a password, and a priority. Call control 20 sends the selected caller transport addresses to callee endpoint 24c at step 128.

Callee endpoint 24c sends the callee transport addresses to server 16b at step 132. Call control 20 selects callee transport addresses step 134. The selection of callee transport addresses may be made in a manner similar to the selection of caller transport addresses at step 126. According to the illustrated embodiment, since caller and callee endpoints 24 are of different regions 12, call control 20 selects the external address of callee endpoint 24c. If, however, caller and callee endpoints 24 are of the same regions 12, call control 20 may select the internal address of callee endpoint 24c. Call control 20 sends the selected callee transport addresses to caller endpoint 24a at step 136. Endpoints 24 communicate using the selected addresses provided to them at step 140. The method then terminates.

Modifications, additions, or omissions may be made to the method without departing from the scope of the invention. The method may include more, fewer, or other steps. Additionally, steps may be performed in any suitable order without departing from the scope of the invention.

Figure 4:
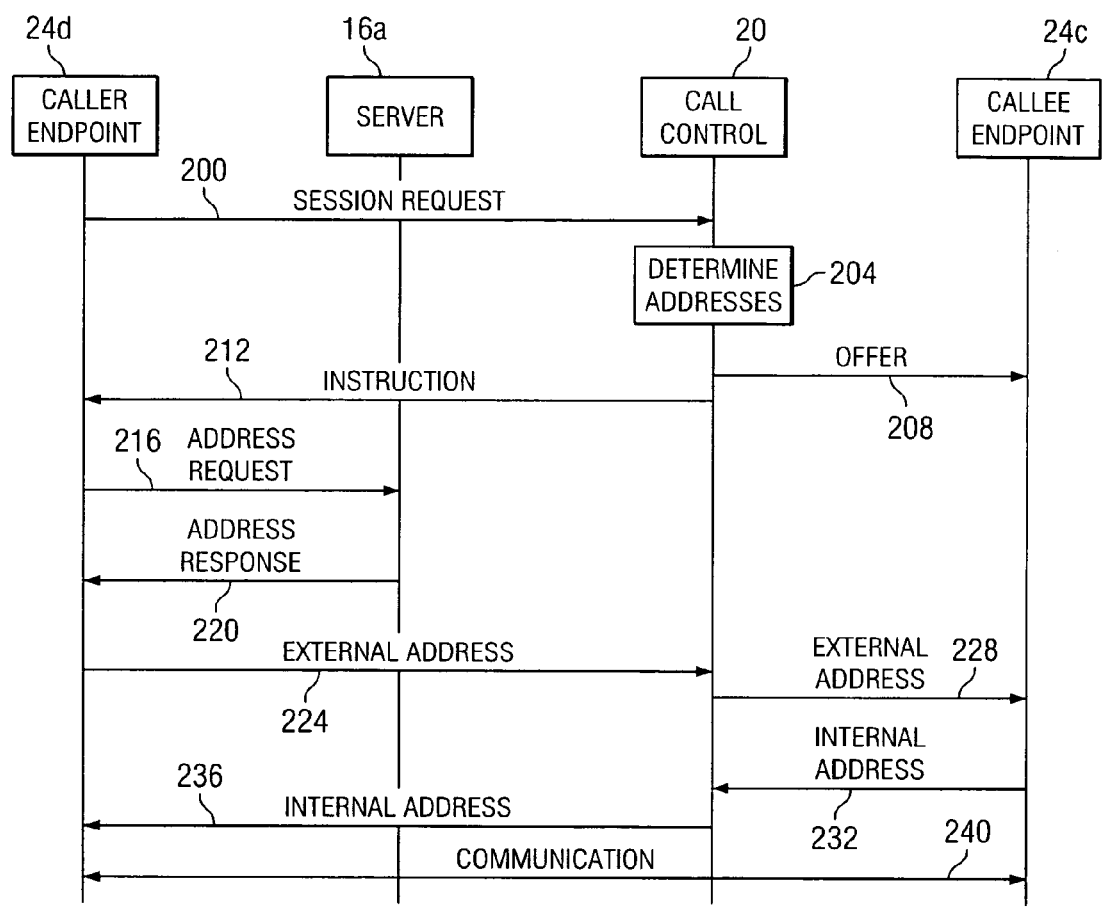
FIG. 4 is a call flow diagram of another embodiment of a method for selecting transport addresses.

FIG. 4 is a call flow diagram of one embodiment of a method for selecting transport addresses for a call session between endpoints 24 of different regions 12 coupled by a network address translator 26. According to the embodiment, caller endpoint 24d of region 12c initiates a call session with callee endpoint 24c of region 12b, where network address translator 26c provides external addresses that may be used in region 12b.

The method begins at step 200, where caller endpoint 24d sends a request for a call session with callee endpoint 24c to call control 20. Call control 20 determines addresses that may be used at step 204. According to the illustrated embodiment, caller endpoint 24d and callee endpoint 24c may communicate using the internal address of callee endpoint 24c and the external address of caller endpoint 24d as provided by server 16a.

Call control 20 sends an offer for the call session to callee endpoint 24c at step 208. The offer may instruct callee endpoint 24c to send an internal address to call control 20. Call control 20 sends an instruction to caller endpoint 24d at step 212. The instruction may instruct caller endpoint 24d to contact server 16a to obtain an external address, and to send the external address to call control 20.

Caller endpoint 24d sends an address request to server 16a to gather caller transport addresses at step 216. Server 16a determines the transport addresses, which may include an external address and an internal address for caller endpoint 24d. Server 16a sends the addresses to caller endpoint 24d in an address response at step 220.

Caller endpoint 24d sends the external caller address to call control 20 at step 224. Call control 20 forwards the external caller address to callee endpoint 24c at step 228. Callee endpoint 24c sends the internal callee address to call control 20 at step 232. Call control 20 forwards the internal callee address to caller endpoint 24d at step 236. Endpoints 24 communicate using the external caller address and the internal callee address at step 240. The method then terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that an optimizer may select transport addresses that have a higher probability of enabling communication between endpoints over addresses that have a lower probability. The endpoints may attempt to communicate using the selected addresses, but not the other addresses. Attempting communication with addresses that have a higher probability of enabling communication may provide for more efficient communication between endpoints.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for selecting a transport address for a call session between a first endpoint and a second endpoint, comprising:
   determining that a call session between a first endpoint and a second endpoint is being initiated, the first endpoint belonging to a first region corresponding to a first network address translator, the first network address translator operable to translate an address for a device of the first region, the second endpoint belonging to a second region corresponding to a second network address translator, the second network address translator operable to translate an address for a device of the second region;
   determining a relationship between the first region and the second region; and
   identifying one or more transport addresses from a plurality of transport addresses in accordance with the relationship to yield one or more selected transport addresses, the plurality of transport addresses corresponding to the first endpoint, the selection yielding one or more non-selected transport addresses.

2. The method of claim 1, wherein:
determining the relationship between the first region and the second region further comprises determining that the first region intersects the second region; and
identifying the one or more transport addresses further comprises selecting the transport addresses associated with the intersection of the first region the second region.

3. The method of claim 1, wherein:
determining the relationship between the first region and the second region further comprises determining that the first region and the second region are substantially the same region; and
identifying the one or more transport addresses further comprises selecting one or more transport addresses associated with the first region and the second region.

4. The method of claim 1, wherein:
determining the relationship between the first region and the second region further comprises determining that the first region and the second region are substantially distinct regions; and
identifying the one or more transport addresses further comprises:
   establishing a third region that comprises the first region and the second region; and
   selecting one or more transport addresses associated with the third region.

5. The method of claim 1, further comprising:
receiving the plurality of transport addresses from the first endpoint, the first endpoint operable to obtain the plurality of transport addresses from a server.

6. The method of claim 1, further comprising:
determining a particular server operable to provide the one or more selected transport addresses; and
instructing the first endpoint to obtain the one or more selected transport addresses from the particular server.

7. A device for selecting a transport address for a call session between a first endpoint and a second endpoint, comprising:
   a memory operable to store information about a call session between a first endpoint and a second endpoint is being initiated, the first endpoint belonging to a first region corresponding to a first network address translator, the first network address translator operable to translate an address for a device of the first region, the second endpoint belonging to a second region corresponding to a second network address translator, the second network address translator operable to translate an address for a device of the second region; and
   a processor coupled to the input and operable to:
      determine a relationship between the first region and the second region; and
      identify one or more transport addresses from a plurality of transport addresses in accordance with the relationship to yield one or more selected transport addresses, the plurality of transport addresses corresponding to the first endpoint, the selection yielding one or more non-selected transport addresses.

8. The device of claim 7, wherein the processor is further operable to:
  determine the relationship between the first region and the second region by determining that the first region intersects the second region; and
  identify the one or more transport addresses by selecting the transport addresses associated with the intersection of the first region the second region.

9. The device of claim 7, wherein the processor is further operable to:
  determine the relationship between the first region and the second region by determining that the first region and the second region are substantially the same region; and
  identify the one or more transport addresses by selecting one or more transport addresses associated with the first region and the second region.

10. The device of claim 7, wherein the processor is further operable to:
  determine the relationship between the first region and the second region by determining that the first region and the second region are substantially distinct regions; and
  identify the one or more transport addresses by:
    establishing a third region that comprises the first region and the second region; and
    selecting one or more transport addresses associated with the third region.

11. The device of claim 7, wherein the processor is further operable to:
  receive the plurality of transport addresses from the first endpoint, the first endpoint operable to obtain the plurality of transport addresses from a server.

12. The device of claim 7, wherein the processor is further operable to:
  determine a particular server operable to provide the one or more selected transport addresses; and
  instruct the first endpoint to obtain the one or more selected transport addresses from the particular server.

13. Logic for selecting a transport address for a call session between a first endpoint and a second endpoint, the logic embodied in a medium and operable to:
  determine that a call session between a first endpoint and a second endpoint is being initiated, the first endpoint belonging to a first region corresponding to a first network address translator, the first network address translator operable to translate an address for a device of the first region, the second endpoint belonging to a second region corresponding to a second network address translator, the second network address translator operable to translate an address for a device of the second region;
  determine a relationship between the first region and the second region; and
  identify one or more transport addresses from a plurality of transport addresses in accordance with the relationship to yield one or more selected transport addresses, the plurality of transport addresses corresponding to the first endpoint, the selection yielding one or more non-selected transport addresses.

14. The logic of claim 13, further operable to:
  determine the relationship between the first region and the second region by determining that the first region intersects the second region; and
  identify the one or more transport addresses by selecting the transport addresses associated with the intersection of the first region the second region 15. The logic of claim 13, further operable to:
  determine the relationship between the first region and the second region by determining that the first region and the second region are substantially the same region; and
  identify the one or more transport addresses by selecting one or more transport addresses associated with the first region and the second region.

16. The logic of claim 13, further operable to:
  determine the relationship between the first region and the second region by determining that the first region and the second region are substantially distinct regions; and
  identify the one or more transport addresses by:
    establishing a third region that comprises the first region and the second region; and
    selecting one or more transport addresses associated with the third region.

17. The logic of claim 13, further operable to:
  receive the plurality of transport addresses from the first endpoint, the first endpoint operable to obtain the plurality of transport addresses from a server.

18. The logic of claim 13, further operable to:
  determine a particular server operable to provide the one or more selected transport addresses; and
  instruct the first endpoint to obtain the one or more selected transport addresses from the particular server.

19. A system for selecting a transport address for a call session between a first endpoint and a second endpoint, comprising:
  means for determining that a call session between a first endpoint and a second endpoint is being initiated, the first endpoint belonging to a first region corresponding to a first network address translator, the first network address translator operable to translate an address for a device of the first region, the second endpoint belonging to a second region corresponding to a second network address translator, the second network address translator operable to translate an address for a device of the second region;
  means for determining a relationship between the first region and the second region; and
  means for identifying one or more transport addresses from a plurality of transport addresses in accordance with the relationship to yield one or more selected transport addresses, the plurality of transport addresses corresponding to the first endpoint, the selection yielding one or more non-selected transport addresses.

20. A method for selecting a transport address for a call session between a first endpoint and a second endpoint, comprising:
  determining that a call session between a first endpoint and a second endpoint is being initiated, the first endpoint belonging to a first region corresponding to a first network address translator, the first network address translator operable to translate an address for a device of the first region, the second endpoint belonging to a second region corresponding to a second network address translator, the second network address translator operable to translate an address for a device of the second region;
  determining a relationship between the first region and the second region;
  identifying one or more transport addresses from a plurality of transport addresses in accordance with the relationship to yield one or more selected transport addresses, the plurality of transport addresses corresponding to the first endpoint, the selection yielding one or more non-selected transport addresses, wherein determining and identifying further comprises performing one of a plurality of procedures comprising:
a first procedure comprising:
   determining that the first region intersects the second region; and
   selecting the transport addresses associated with the intersection of the first region the second region;
a second procedure comprising:
   determining that the first region and the second region are substantially the same region; and
   selecting one or more transport addresses associated with the first region and the second region; and
a third procedure comprising:
   determining that the first region and the second region are substantially distinct regions;
   establishing a third region that comprises the first region and the second region; and
   selecting one or more transport addresses associated with the third region;
receiving the one or more selected transport addresses by performing at least one of the following:
   receiving the plurality of transport addresses from the first endpoint, the first endpoint operable to obtain the plurality of transport addresses from a server; and
   determining a particular server operable to provide the one or more selected transport addresses, and instructing the first endpoint to obtain the one or more selected transport addresses from the particular server.

* * * * *